US007280468B2

United States Patent
Kang et al.

(10) Patent No.: US 7,280,468 B2
(45) Date of Patent: Oct. 9, 2007

(54) APPARATUS FOR CONSTANT AMPLITUDE CODED BI-ORTHOGONAL DEMODULATION

(75) Inventors: Sung-Jin Kang, Kyeonggi-Do (KR); Jin-Woong Cho, Kyeonggi-Do (KR); Cheol-Hee Park, Seoul (KR); Min-Chul Ju, Kyeonggi-Do (KR); Dae-Ki Hong, Seoul (KR); Kyeung-Hak Seo, Seoul (KR); Myoung-Jin Kim, Seoul (KR)

(73) Assignee: Korea Electronics Technology Institute, Kyunggi-do (KR)

( * ) Notice: Subject to any disclaimer, the term of this patent is extended or adjusted under 35 U.S.C. 154(b) by 998 days.

(21) Appl. No.: 10/649,647

(22) Filed: Aug. 28, 2003

(65) Prior Publication Data

US 2004/0146116 A1 Jul. 29, 2004

(30) Foreign Application Priority Data

Jan. 24, 2003 (KR) .................. 10-2003-0004940

(51) Int. Cl.
*H04J 11/00* (2006.01)
(52) U.S. Cl. .................. 370/208; 370/342; 714/52; 714/797; 714/801
(58) Field of Classification Search .............. None
See application file for complete search history.

(56) References Cited

U.S. PATENT DOCUMENTS

| 5,675,572 | A | 10/1997 | Hidejima et al. |
| 6,091,784 | A | 7/2000 | Park et al. |
| 6,298,099 | B1 | 10/2001 | Resnikoff et al. |
| 6,434,111 | B1 | 8/2002 | Voyer et al. |
| 6,668,352 | B1 * | 12/2003 | Jung .................. 714/800 |

* cited by examiner

*Primary Examiner*—Doris H. To
*Assistant Examiner*—Christopher Grey
(74) *Attorney, Agent, or Firm*—Bacon & Thomas, PLLC

(57) ABSTRACT

A constant amplitude coded bi-orthogonal demodulator demodulates the received constant amplitude bi-orthogonal modulated data, cancels the parity bits to generate the serial data, detects the occurrence of an error by dividing the demodulated data into a plurality of groups of data, outputs the serial data as demodulated data if an error does not occur, sequentially converts bit polarities of data of groups in which an error occurs if the error detector detects the error, compares distances between the received bi-orthogonal modulated data and the constant amplitude coded bi-orthogonal modulated data, and selects, as demodulated data, data of which corresponding bit polarities are changed according to the comparison results.

According to the present invention, power consumption is reduced, a power amplifier can be manufactured at an inexpensive cost, interference robustness can be ensured, and data can be transmitted at a high transmission rate and a variable transmission rate.

8 Claims, 3 Drawing Sheets

APPARATUS FOR CONSTANT AMPLITUDE CODED BI-ORTHOGONAL DEMODULATION

BACKGROUND OF THE INVENTION

1. Field of the Invention

The present invention relates to an apparatus for constant amplitude coded bi-orthogonal modulation and demodulation, which modulates predetermined data to be transmitted into constant amplitude coded bi-orthogonal data, and demodulates the modulated constant amplitude coded bi-orthogonal data into original data and corrects errors in a wireless communication system using the code division multiple access.

2. Description of the Related Art

As for schemes of modulating predetermined data to be transmitted in a communication system, there have been known a direct sequence/code division multiple access (DS/CDMA) scheme, a frequency hopping CDMA scheme, a complementary code keying (CCK) scheme, a multi-code (MC) CDMA scheme, a pulse width (PW) CDMA scheme, a multi phase (MP) CDMA scheme, and the like.

Since the DS/CDMA scheme has a characteristic of constant amplitude and can employ a power amplifier with a simple configuration, its power consumption is relatively low. Further, it can ensure interference rejection capability by substantially performing spread spectrum modulation using Baker codes. However, its data transmission rate is low due to the frequency spread. Moreover, although it provides a variable transmission rate, there is a problem in that its effectiveness is low since the variable range is small. Thus, the DS/CDMA scheme has been mainly employed in IS (Interim Standard)—95.

FH/CDMA-based communication systems have low power consumption and reduced production costs due to the use of simplified power amplifiers, and can ensure interference robustness through the frequency hopping. However, there are problems in that it cannot provide a high transmission rate and it is very limited in the capability of providing a variable transmission rate.

The CCK scheme has been employed in IEEE 802.11b WLAN (Wireless Local Area Network). In the CCK scheme, there are advantages in that its power consumption is low due to the use of signals with a constant amplitude, production costs can be reduced due to the use of simplified power amplifiers, and it can provide a high transmission rate. However, there are problems in that it cannot ensure substantial interference rejection capability or provide a variable transmission rate. In addition, the CCK scheme can be considered as a kind of complex orthogonal modulation. Since code orthogonality for use in enhancing a characteristic of strong resistance against multipath fading may be damaged, there is a problem in that its performance rather degrades under the environment in which delay spread of the multipath fading is low.

The MC/CDMA scheme is a method by which a plurality of orthogonal codes are assigned to a single user. It has been adopted as a standard of the third generation CDMA mobile communication system and described as a standard scheme of 3GPP (Third Generation Partnership Project) or 3GPP2 (Third Generation Partnership Project 2). The MC/CDMA scheme has been developed for providing a user with a high transmission rate and it is more likely to be continually used for a communication system that requires a high transmission rate. However, in a communication system using the MC/CDMA scheme, signals of the MC/CDMA are configured like passband PAM (Pulse Amplitude Modulation) signals when the signals of MD/CDMA are viewed in terms of a time axis. Since there are various amplitudes of transmitted signals so that the system requires a wide range of linear operation in a power amplifier used for a transmitter/receiver, it is difficult to manufacture the power amplifier and production costs thereof increase. If the constant amplitude characteristic can be obtained through a proper coding procedure in signal processing of a base band, passband signals also obtain a constant amplitude so that the production costs of the power amplifier can be greatly reduced and benefit can be obtained in view of power consumption.

As a method of solving these problems incurred due to increase in the levels of modulated signals resulting from the use of multi codes involved with the increased number of channels of transmission data, the PW/CDMA scheme and the MP/CDMA scheme have been suggested.

The PW/CDMA scheme limits output symbol levels of a digital adder to clip portions thereof exceeding a predetermined level value, converts only the values of the remaining levels into pulse widths, and then transmits the pulse widths, so that waveforms of signals always are in a binary form. Although the modulated signals are advantageously in the binary form, there is a disadvantage in that as the number of removed levels in the modulated signals increases, the bandwidth of the modulated signals increases in proportion to the number of the levels.

The MP/CDMA scheme has been suggested as another method of obtaining signals with a constant amplitude. In the MP CDMA scheme, values exceeding a predetermined level value are clipped by a level limiter from symbols with various level values made according to the MC/CDMA scheme, the results obtained through the clipping are converted into phase values, and modulated signals with the converted phase values are amplified by and transmitted from a power amplifier. In other words, the PW/CDMA scheme is a scheme for limiting the output symbols according to the MC/CDMA scheme to a predetermined level and converting the remaining symbols into the pulse widths. The MP/CDMA scheme is a scheme for limiting the level and then converting the remaining symbols into the phases of carrier waves.

The PW/CDMA scheme has an advantage in that the waveform can be simplified, but a problem in that as the number of remaining levels increases, the bandwidth of the modulated signals increase in proportion to the number of remaining levels. However, in the MP/CDMA scheme, the bandwidth becomes constant regardless of the number of levels. Further, in the MP/CDMA scheme, there is an advantage in that the system can be simplified since the level values of the signals are prevented from being increased by clipping portions exceeding a predetermined level value of the signals.

However, the MP/CDMA scheme should use the same number of orthogonal codes as that of transmitted information channels since one orthogonal code is assigned to each channel of data transmitted. Thus, the number of orthogonal codes put to use increases as the number of data channel increases. Accordingly, in the procedure of limiting the levels of the multi-level signals, there is a problem in that the orthogonality of the orthogonal codes is damaged and thus mutual interference between the transmitted signals may happen.

SUMMARY OF THE INVENTION

Therefore, an object of the present invention is to provide an apparatus for constant amplitude coded bi-orthogonal modulation, which performs the constant amplitude coded bi-orthogonal modulation for data in a communication system using the CDMA, thereby reducing power consumption of the system, manufacturing a power amplifier at an inexpensive cost, ensuring interference resilience and transmitting predetermined data at a high transmission rate and a variable transmission rate.

Another object of the present invention is to provide an apparatus for constant amplitude coded bi-orthogonal demodulation, wherein errors of data subjected to the constant amplitude coded bi-orthogonal modulation are corrected by using additional data, which have been added for performing the constant amplitude coded bi-orthogonal modulation, as parity bits, and the performance of correcting errors of data bits of the system is improved.

According to one aspect of the present invention for achieving the objects, there is provided an apparatus for constant amplitude coded bi-orthogonal modulation, comprising a serial to parallel converter for converting input serial data into a plurality of groups of signals each of which has a plurality of data bits, a signal having a plurality of data bits in one group selected among the plurality of groups, or a signal having one data bit and a plurality of data bits with a fixed value in the selected group, according to a data rate control signal; a constant amplitude encoder for generating parity bits by combining the plurality of data bits of each of the groups when the serial to parallel converter converts the serial data into the plurality of groups of signals each of which has the plurality of data bits; an orthogonal code generator for generating a plurality of orthogonal codes with different values; a plurality of bi-orthogonal modulation units for performing bi-orthogonal modulation by selecting one orthogonal code among the plurality of orthogonal codes according to the data bits of each of the groups converted by the serial to parallel converter and the parity bits generated by the constant amplitude encoder, and by adjusting the polarity; and a parallel summer for parallel summing up output signals from the plurality of bi-orthogonal modulators to generate constant amplitude bi-orthogonal modulated data. Each of the bi-orthogonal modulation units performs the bi-orthogonal modulation for the signal having one data bit ($b0$) and the plurality of data bits ($b1$, $b2$) with the fixed value in the selected group when the serial to parallel converter outputs the data bit ($b0$) and the plurality of data bits ($b1$, $b2$) with the fixed value. Each of the bi-orthogonal modulation units comprises an orthogonal modulator for selecting an orthogonal code ($c0$) generated by the orthogonal code generator according to the data bits ($b1$, $b2$); and a multiplier for multiplying the orthogonal code ($c0$) selected by the orthogonal modulator by the data bit ($b0$) to adjust the polarity and for generating the constant amplitude bi-orthogonal modulated data shown in Table 1 below.

TABLE 1

| $b_0$ | $b_1$ | $b_2$ | Constant amplitude bi-orthogonal modulated data |
|---|---|---|---|
| 0 | 0 | 0 | $-c_0$ |
| 1 | 0 | 0 | $c_0$ |

Preferably, each of the bi-orthogonal modulation units performs the bi-orthogonal modulation for the signal having the plurality of data bits ($b_0$~$b_2$) in the selected group when the serial to parallel converter outputs the plurality of data bit ($b1$, $b2$). Each of the bi-orthogonal modulation units comprises an orthogonal modulator for selecting one of the plurality of orthogonal codes ($c0$), ($c1$), ($c2$), ($c3$) generated by the orthogonal code generator according to the data bits ($b1$, $b2$) when the serial to parallel converter converts the input serial data into the signal having the plurality of data bits ($b0$~$b2$) in the selected group; and a multiplier for multiplying the orthogonal code selected among the plurality of orthogonal codes ($c0$), ($c1$), ($c2$), ($c3$) by the orthogonal modulator by the data bit ($b0$) to adjust the polarity and for generating the constant amplitude bi-orthogonal modulated data shown in Table 2 below.

TABLE 2

| $b_0$ | $b_1$ | $b_2$ | Constant amplitude bi-orthogonal modulated data |
|---|---|---|---|
| 0 | 0 | 0 | $-c_0$ |
| 0 | 0 | 1 | $-c_1$ |
| 0 | 1 | 0 | $-c_2$ |
| 0 | 1 | 1 | $-c_3$ |
| 1 | 0 | 0 | $c_0$ |
| 1 | 0 | 1 | $c_1$ |
| 1 | 1 | 0 | $c_2$ |
| 1 | 1 | 1 | $c_3$ |

According to another aspect of the present invention, there is provided an apparatus for constant amplitude coded bi-orthogonal demodulation, comprising: a bi-orthogonal demodulation unit for demodulating received constant amplitude bi-orthogonal modulated data, canceling parity bits and then generating serial data; an error detector for detecting the occurrence of an error while dividing the data demodulated in the bi-orthogonal demodulation unit into a plurality of groups of data and then outputting the serial data of the bi-orthogonal demodulator as demodulated data if an error does not occur; an error bit polarity converter for sequentially converting bit polarities of data of groups with errors if the error detector detects the errors and converting the data of groups with errors and the data of groups with no errors into the serial data; a constant amplitude coded bi-orthogonal modulator for performing the constant amplitude coded bi-orthogonal modulation for the output data of the error bit polarity converter; a distance comparator for comparing bit-by-bit distances between the received bi-orthogonal modulated data and the constant amplitude coded bi-orthogonal modulated data of the constant amplitude coded bi-orthogonal modulator; and a buffer for storing a number of serial data output from the error bit polarity converter and selectively outputting the corresponding serial data as demodulated data according to a control signal of the distance comparator.

Preferably, the bi-orthogonal demodulation unit comprises a bi-orthogonal demodulator for demodulating the received bi-orthogonal modulated data; a parity bit canceller for canceling the parity bits from the output data of the bi-orthogonal demodulator; a plurality of switches for switching the data of the parity bit canceller according to the output signal of the error detector; and a parallel to serial converter for receiving the switched data from the plurality of switches if the error detector has not detected errors and converting the data into serial demodulated data.

The error detector may comprise first to third parity checkers for receiving the plurality of groups of data output from the bi-orthogonal demodulator, checking the parity bits, determining the occurrence of errors and controlling the plurality of switches; and an OR gate for generating an error determining signal by performing an OR operation for output signals of the first to third parity checkers.

The error bit polarity converter may comprise first to third bit polarity converters for receiving the data of the groups in which errors have occurred through the plurality of switches and converting their polarities; a plurality of OR gates for performing OR operations for output data of the first to third bit polarity converters and data with no error switched in the plurality of switches; and a parallel to serial converter for converting output data of the plurality of OR gates into serial data.

BRIEF DESCRIPTION OF THE DRAWINGS

The above and other objects, advantages and features of the present invention will become apparent from the following description of preferred embodiments given in conjunction with the accompanying drawings, in which.

DESCRIPTION OF THE PREFERRED EMBODIMENTS

Hereinafter, a constant amplitude coded bi-orthogonal modulator and demodulator of the present invention will be described in detail with reference to the accompanying drawings.

Figure 1:
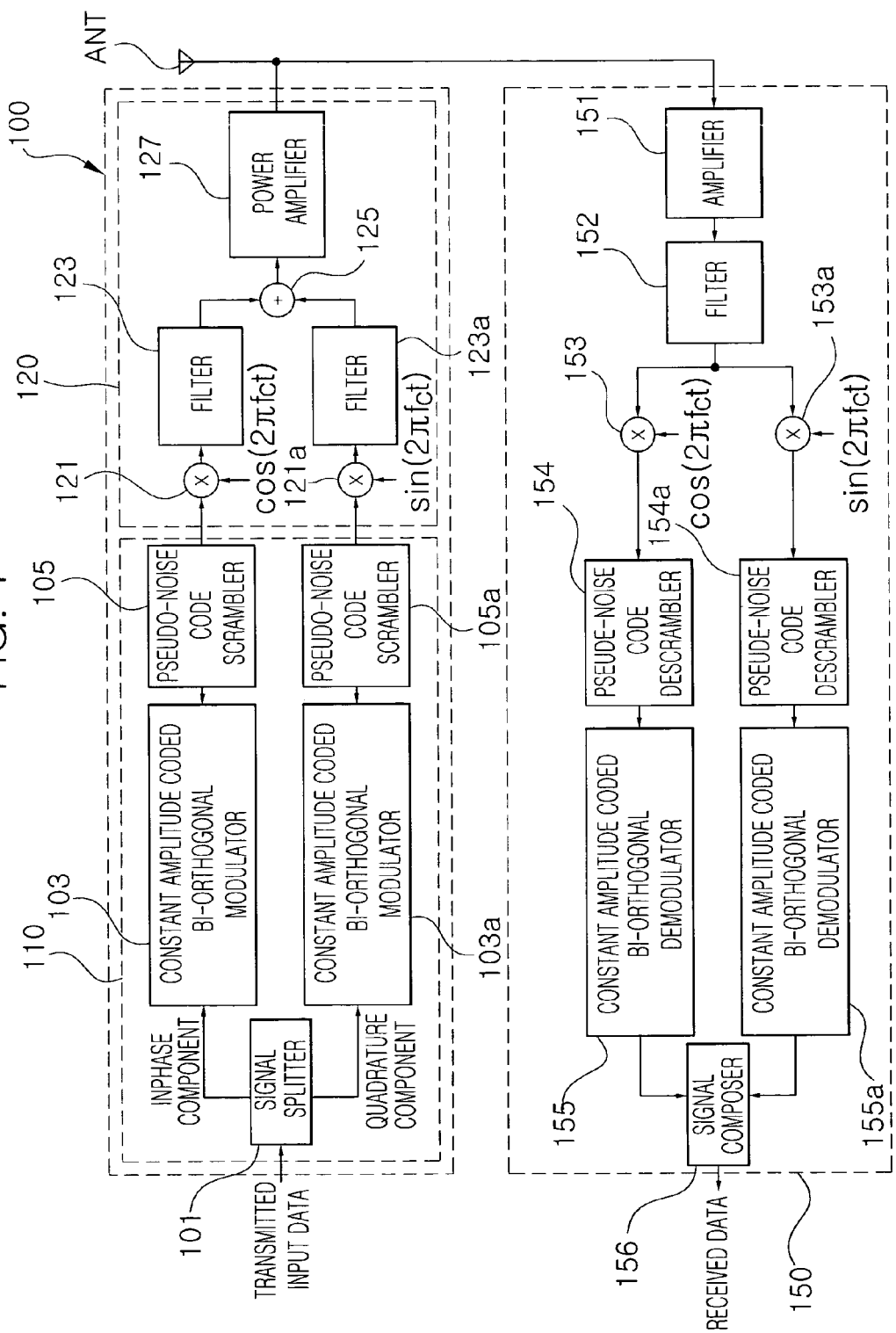
FIG. 1 shows block diagrams of a transmitter and a receiver of a wireless communication system to which a constant amplitude coded bi-orthogonal modulator and demodulator of the present invention can be applied.

FIG. 1 shows block diagrams illustrating configurations of a transmitter and a receiver of a communication system to which the modulator and demodulator of the present invention are applied. Here, reference numeral 100 designates the transmitter, and reference numeral 150 designates the receiver.

The transmitter 100 comprises a baseband unit 110 and a high frequency unit 120.

In the baseband unit 110, input data to be transmitted, which have predetermined transmission rates such as K/16 Mbps, 2K/16 Mbps, 3K/16 Mbps, 6K/16 Mbps, 9K/16 Mbps and 18K/16 Mbps, are input into a signal splitter 101.

Here, the constant K is the required channel bandwidth in a pass band and is obtained as follows:

$$K = A/(1+a) \quad (1)$$

where A is the required minimum bandwidth in the pass band and a is the roll-off factor of a filter.

The data input into the signal splitter 101 are split into inphase and quadrature components therein.

The inphase and quadrature components split in the signal splitter 101 are modulated into multiple codes in constant amplitude coded bi-orthogonal modulators 103 and 103a, respectively, to be converted into data with a constant amplitude. The data are scrambled in pseudo-noise (PN) code scramblers 105 and 105a to obtain a security effect, an interference cancellation effect, and an effect of managing the performance degradation in a fading channel.

Data output from the pseudo-noise code scrambler 105 and 105a of the baseband unit 110 are multiplied respectively by carrier signals with a predetermined frequency, i.e. $\cos(2\pi fct)$ and $\sin(2\pi fct)$ (fc is a frequency of the carrier signals) in respective multipliers 121 and 121a of the high frequency unit 120 to be modulated into carrier signals. Then, they are filtered in filters 123 and 123a, respectively, and then summed in a summer 125 so that BPSK (Binary Phase Shift Keying) or QPSK (Quadrature Phase Shift Keying) data are generated. The BPSK or QPSK data are amplified through a power amplifier 127 and transmitted through an antenna ANT.

Further, in the receiver 150, signals received through the antenna ANT are amplified in an amplifier 151 and then filtered in a filter 152 to detect data with a predetermined frequency.

Output signals of the filter 152 are multiplied by carrier signals with a predetermined frequency, i.e. $\cos(2\pi fct)$ and $\sin(2\pi fct)$ in multipliers 153 and 153a, respectively, so that the carrier signals are cancelled and the inphase and quadrature phase components are extracted therefrom, respectively. The extracted signals of the inphase and quadrature phase components are descrambled in pseudo-noise code descramblers 154 and 154a, respectively, and then output.

The signals descrambled in the pseudo-noise code descramblers 154 and 154a are input into and demodulated in constant amplitude coded bi-orthogonal demodulators 155 and 155a, and the signals of the demodulated inphase and quadrature phase components are combined in and output from a signal composer 156.

In a case where biphase shift keying (BPSK) is used in the transmitter and receiver of such a communication system, the transmitter 100 uses only either the bi-orthogonal modulator 103, the pseudo-noise code scrambler 105, the multiplier 121 and the filter 123, or the bi-orthogonal modulator 103a, the pseudo-noise code scrambler 105a, the multiplier 121a and the filter 123a, which are arranged in parallel. The receiver 150 uses only either the multiplier 153, the pseudo-noise code descrambler 154 and the constant amplitude coded bi-orthogonal demodulator 155, or the multiplier 153a, the pseudo-noise code descrambler 154a and the constant amplitude coded bi-orthogonal demodulator 155a, which are arranged in parallel. Meanwhile, in a case where quadrature phase shift keying (QPSK) is used, the transmitter and receiver uses both of them. In addition, as for data rates at which the high frequency unit 120 transmits the data, the constant amplitude coded bi-orthogonal modulators 103 and 103a of the present invention provide variable data rates such as K/16, 3K/16 and 9K/16 Mbps in case of the use of BPSK, and 2K/16, 6K/16 and 18K/16 Mbps in case of the use of QPSK. The constant amplitude coded bi-orthogonal demodulators 155 and 155a demodulate the data into the original data.

The foregoing description means that the maximum spectral efficiency is 9/8. That is, the present invention is very efficient and a large amount of data can be transmitted. The various transmission rates can be provided in accordance with the environment of the transmission channel, and it is possible to maintain interference robustness by performing reliable constant amplitude coded bi-orthogonal modulation and demodulation in accordance with the transmission rate.

In addition, receivers with the same configuration can be used for the various transmission rates, and linearity requirements for linear operation ranges of the power amplifier 127 and amplifier 151 put to use are alleviated by the constant amplitude characteristic of the constant amplitude coded bi-orthogonal modulators 103 and 103a and demodulators 155 and 155a of the present invention. Accordingly, the manufacturing costs and power consumption of the power amplifier 158 and amplifier 151 can be minimized.

Figure 2:
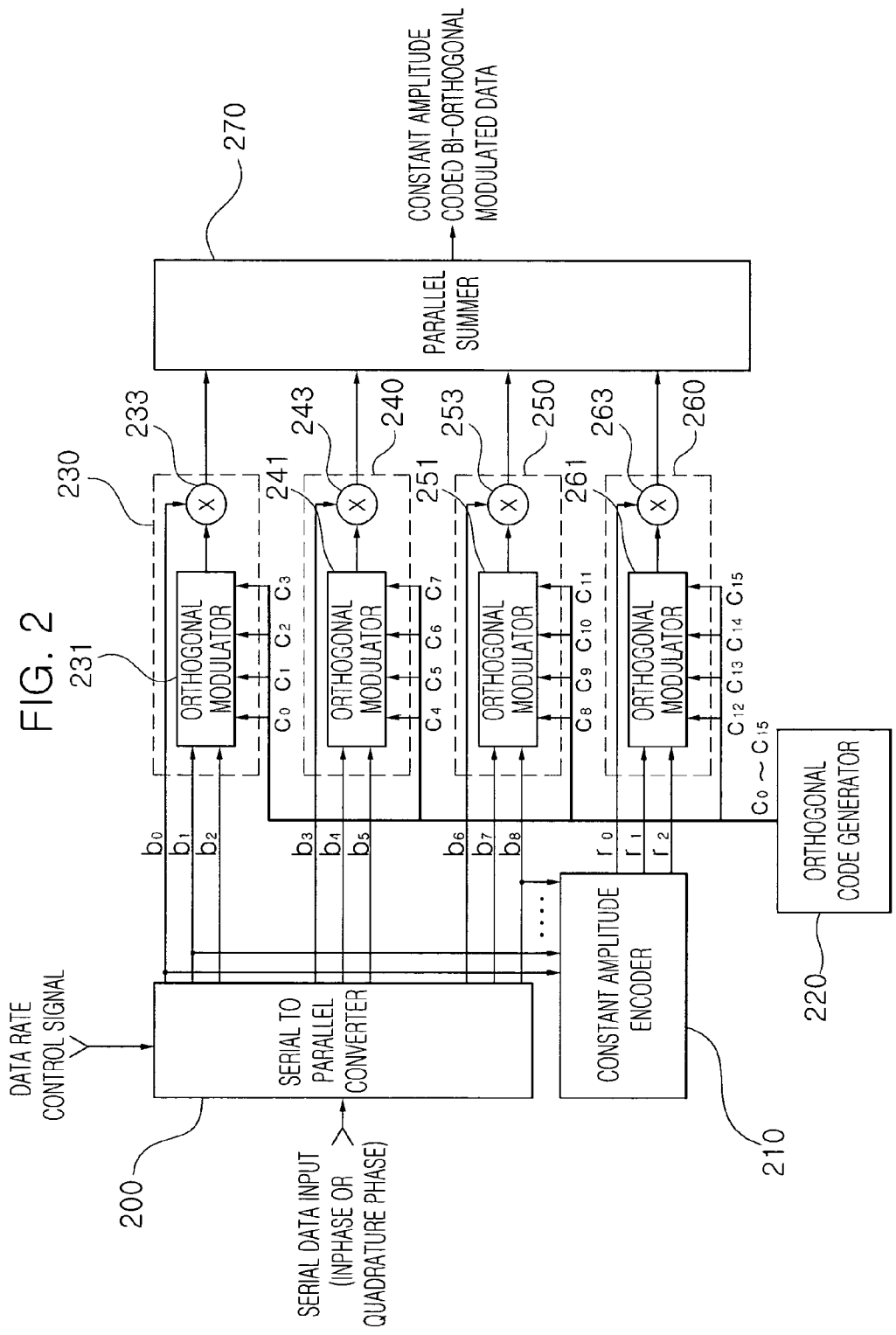
FIG. 2 is a block diagram illustrating the detailed configuration of the constant amplitude coded bi-orthogonal modulator shown in FIG. 1.

FIG. 2 is a block diagram illustrating the detailed configuration of the constant amplitude coded bi-orthogonal modulator 103 or 103a shown in FIG. 1. As shown in FIG. 2, it comprises a serial to parallel converter 200 for converting serial data of the inphase or quadrature phase component split in the signal splitter 102 of FIG. 1 into one data bit ($b_0$) and data bits ($b_1$, $b_2$) with a fixed value, a group of a plurality of data bits ($b_0 \sim b_2$), or a plurality of groups of data bits ($b_0 \sim b_2$), ($b_3 \sim b_5$), ($b_6 \sim b_8$) according to a data rate control signal; a constant amplitude encoder 210 for generating a plurality of parity bits ($r_0$), ($r_1$), ($r_2$) by combining the plurality of groups of data bits ($b_0 \sim b_2$), ($b_3 \sim b_5$), ($b_6 \sim b_8$) converted by the serial to parallel converter 200; an orthogonal code generator 220 for generating a plurality of groups of orthogonal codes ($c_0 \sim c_3$), ($c_4 \sim c_7$), ($c_8 \sim c_{11}$), ($c_{12} \sim c_{15}$) of which values of multiple bits are different from one another; a plurality of bi-orthogonal modulation units 230, 240, 250 and 260 for selecting one orthogonal code in each of the plurality of groups of orthogonal codes ($c_0 \sim c_3$), ($c_4 \sim c_7$), ($c_8 \sim c_{11}$), ($c_{12} \sim c_{15}$) generated from the orthogonal code generator 220 according to the plurality of groups of data bits ($b_0 \sim b_2$), ($b_3 \sim b_5$), ($b_6 \sim b_8$) converted by the serial to parallel converter 200 and the plurality of parity bits ($r_0 \sim r_2$), and for managing the polarity; and a parallel summer 270 for parallel summing up the orthogonal codes output from the plurality of bi-orthogonal modulation units 230, 240, 250 and 260 to generate constant amplitude bi-orthogonal modulated data.

Each of the plurality of bi-orthogonal modulation units 230, 240, 250 or 260 comprises an orthogonal modulator 231, 241, 251 or 261 for selecting one among the plurality of groups of orthogonal codes ($c_0 \sim c_3$), ($c_4 \sim c_7$), ($c_8 \sim c_{11}$) or ($c_{12} \sim c_{15}$) according to the data bits ($b_1$, $b_2$), ($b_4$, $b_5$) or ($b_7$, $b_8$) or the parity bits ($r_1$, $r_2$); and a multiplier 233, 243, 253 or 263 for multiplying the output signal of the orthogonal modulator 231, 241, 251 or 261 by the data bit ($b_0$), ($b_3$) or ($b_6$) or the parity bit ($r_0$) to adjust the polarity and for outputting resultant signals to the parallel summer 270.

The operation of the constant amplitude coded bi-orthogonal modulator of the present invention constructed as above will be described according to the provided data rates.

1. In Case of Providing the Data Rates of K/16 Mbps and 2K/16 Mbps

In case of providing the data rate of K/16 Mbps for BPSK and 2K/16 Mbps for QPSK, a parallel sequence of data bits is provided by only one bit with respect to inphase and quadrature phase axes. That is, the serial to parallel converter 200 converts the input serial data of the inphase or quadrature phase into the data bit ($b_0$), and the output data bit ($b_0$) is input into the multiplier 233 of the bi-orthogonal modulation unit 230. At this time, the data bits ($b_1$, $b_2$) are output as the fixed value, i.e. zero, and then input into the orthogonal modulator 231, and the data bits ($b_3 \sim b_8$) are not output.

The orthogonal modulator 231 comprises, for example, a multiplexer and selects the orthogonal codes ($c_0 \sim c_3$) according to the data bits ($b_1$, $b_2$). Therefore, in case of providing the data rates of K/16 Mbps and 2K/16 Mbps, as described above, the orthogonal modulator 231 selects the orthogonal code ($c_0$) among the input orthogonal codes ($c_0 \sim c_3$) according to the value of the data bits ($b_1$, $b_2$), i.e. zero, which the serial to parallel converter 200 outputs. The selected orthogonal code ($c_0$) is multiplied by the data bit ($b_0$) to adjust its polarity in the multiplier 233 and then output as constant amplitude bi-orthogonal data through the parallel summer 270.

That is, in case of providing the data rates of K/16 Mbps and 2K/16 Mbps, only the bi-orthogonal modulation unit 230 is used and the other bi-orthogonal modulation units 240, 250 and 260 and the constant amplitude encoder 210 are not used. The constant amplitude bi-orthogonal modulated data output from the parallel summer 270 according to the data bit output from the serial to parallel converter 200 are shown in Table 1 below.

TABLE 1

| $b_0$ | $b_1$ | $b_2$ | Constant amplitude bi-orthogonal modulated data |
|---|---|---|---|
| 0 | 0 | 0 | $-c_0$ |
| 1 | 0 | 0 | $c_0$ |

2. In Case of Providing Data Rates of 3K/16 Mbps and 6K/16 Mbps

In case of providing the data rate of 3K/16 Mbps for BPSK and 6K/16 Mbps for QPSK, a parallel sequence of data bits is transmitted by three bits with respect to the inphase and quadrature phase axes. That is, the serial to parallel converter 200 converts the input serial data of the inphase or quadrature phase into the data bits ($b_0 \sim b_2$) and outputs the data bits. At this time, the data bits ($b_3 \sim b_8$) are not output.

The data bits ($b_1$, $b_2$) output from the serial to parallel converter 200 are input into the orthogonal modulator 231 of the bi-orthogonal modulation unit 230, and one of the orthogonal codes ($c_0 \sim c_3$) is then selected. The selected orthogonal code ($c_0$), ($c_1$), ($c_2$) or ($c_3$) is input into the multiplier 233 and multiplied by the data bit ($b_0$), and its polarity is adjusted. Then, it is output as the constant amplitude bi-orthogonal data through the parallel summer 270.

Even in case of providing the data rate of 3K/16 Mbps for BPSK and 6K/16 Mbps for QPSK, only the bi-orthogonal modulation unit 230 is used and the other bi-orthogonal modulation units 240, 250 and 260 and the constant amplitude encoder 210 are not used in the same manner as the case of providing the data rates of K/16 Mbps and 2K/16 Mbps. The constant amplitude bi-orthogonal modulated data output from the parallel summer 270 according to the data bit output from the serial to parallel converter 200 are shown in Table 2 below.

TABLE 2

| $b_0$ | $b_1$ | $b_2$ | Constant amplitude bi-orthogonal modulated data |
|---|---|---|---|
| 0 | 0 | 0 | $-c_0$ |
| 0 | 0 | 1 | $-c_1$ |
| 0 | 1 | 0 | $-c_2$ |
| 0 | 1 | 1 | $-c_3$ |
| 1 | 0 | 0 | $c_0$ |
| 1 | 0 | 1 | $c_1$ |
| 1 | 1 | 0 | $c_2$ |
| 1 | 1 | 1 | $c_3$ |

3. In Case of Providing Data Rates of 9K/16 Mbps and 18K/16 Mbps

In case of providing the data rate of 9K/16 Mbps for BPSK and 18K/16 Mbps for QPSK, a parallel sequence of data bits is transmitted by nine bits with respect to the inphase and quadrature phase axes. That is, the serial to parallel converter 200 converts the input serial data of the inphase or quadrature phase into the data bits ($b_0 \sim b_8$) and outputs the data bits.

The data bits ($b_0 \sim b_8$) output from the serial to parallel converter 200 are divided into the plurality of groups of data bits ($b_0 \sim b_2$), ($b_3 \sim b_5$) and ($b_6 \sim b_8$), and the respective divided groups of data bits ($b_0 \sim b_2$), ($b_3 \sim b_5$) and ($b_6 \sim b_8$) are input into the bi-orthogonal modulation units 230, 240 and 250. The orthogonal modulators 231, 241 and 251 select one orthogonal code among the plurality of groups of orthogonal codes ($c_0 \sim c_3$), ($c_4 \sim c_7$) and ($c_8 \sim c_{11}$) according to the input data bits ($b_1$, $b_2$), ($b_4$, $b_5$) and ($b_7$, $b_8$), respectively. The orthogonal codes selected by the orthogonal modulator 231, 241 and 251 are multiplied by the data bits ($b_0$), ($b_3$) and ($b_6$) and their polarities are adjusted, i.e. converted into bi-orthogonal codes, respectively, and then are summed in the parallel summer 270.

When the parallel summer 270 sums the data output from the bi-orthogonal modulation units 230, 240 and 250, the amplitude of the summed data is not kept constant.

Therefore, in the present invention, in order to cause the amplitude of the bi-orthogonal modulated data output from the parallel summer 270 to be kept constant, the constant amplitude encoder 210 receives the plurality of groups of data bits ($b_0 \sim b_2$), ($b_3 \sim b_5$), ($b_6 \sim b_8$) output from the serial to parallel converter 200, combines respective groups of the data bits ($b_0 \sim b_2$), ($b_3 \sim b_5$) and ($b_6 \sim b_8$) as expressed by the following formulas 2 to 4, respectively, and generates the combined data as the parity bits ($r_0$), ($r_1$) and ($r_2$).

$$r_0 = b_0 \oplus b_3 \oplus b_6 \quad (2)$$

$$r_1 = b_1 \oplus b_4 \oplus b_7 \quad (3)$$

$$r_2 = b_2 \oplus b_5 \oplus b_8 \quad (4)$$

where $\oplus$ represents XOR.

The generated parity bits ($r_1$, $r_2$) are input into the orthogonal modulator 261 of the bi-orthogonal modulation unit 260 to select one orthogonal code in a group of the orthogonal codes ($c_{12} \sim c_{15}$). The selected orthogonal code is multiplied by the parity bit ($r_0$), which is the polarity of the constant amplitude, in the multiplier 263 and subjected to the bi-orthogonal modulation. Then, the bi-orthogonal modulated data from the bi-orthogonal modulation unit 260 are summed with the bi-orthogonal modulated data from the bi-orthogonal modulation units 230, 240 and 250 in the parallel summer 270 which in turn outputs the constant amplitude bi-orthogonal modulated data.

Therefore, if the spread ratio is 16, the constant amplitude bi-orthogonal modulated data are obtained. The overall spectrum efficiencies in cases of using BPSK and QPSK are 9/16 and 18/16, respectively. Thus, the data rates of 9K/16 Mbps and 18K/16 Mbps can be obtained.

Figure 3:
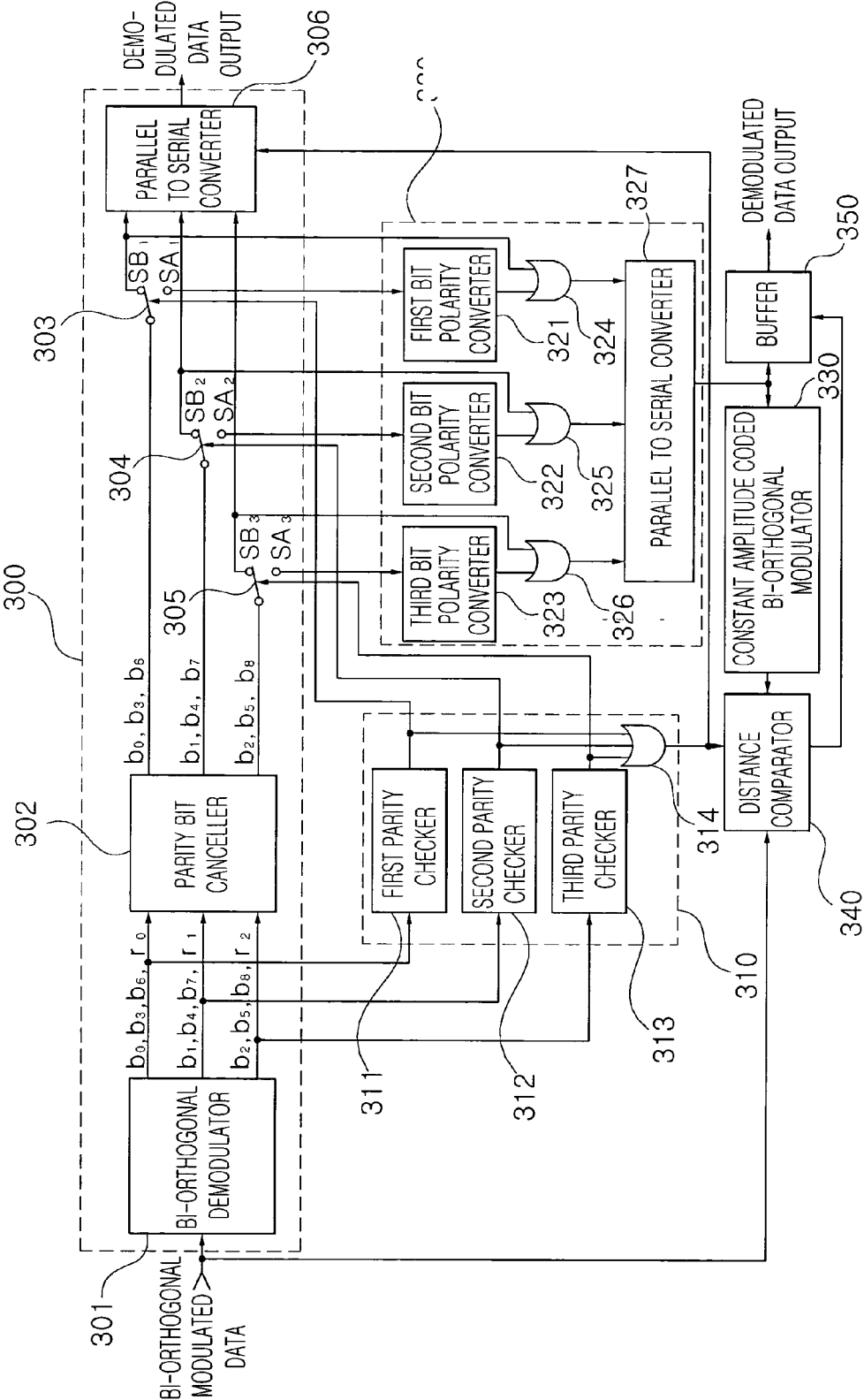
FIG. 3 is a block diagram illustrating the detailed configuration of the constant amplitude coded bi-orthogonal demodulator shown in FIG. 1.

FIG. 3 is a block diagram illustrating the configuration of the constant amplitude coded bi-orthogonal demodulator 155 or 155a shown in FIG. 1. As shown in FIG. 3, the demodulator 155 or 155a comprises a bi-orthogonal demodulation unit 300 for demodulating the received constant amplitude bi-orthogonal modulated data, canceling the parity bits, and then generating the serial data; an error detector 310 for detecting the occurrence of an error while dividing the data demodulated in the bi-orthogonal demodulation unit 300 into a plurality of groups and then outputting the serial data of the bi-orthogonal demodulation unit 300 as demodulated data if an error does not occur; an error bit polarity converter 320 for sequentially converting the bit polarities of data of groups with errors if the error detector 310 detects the errors and converting the data of groups with errors and the data of groups with no errors into the serial data; a constant amplitude coded bi-orthogonal modulator 330 for performing the constant amplitude coded bi-orthogonal modulation for the output data of the error bit polarity converter 320; a distance comparator 340 for comparing bit-by-bit distances between the received bi-orthogonal modulated data and the constant amplitude coded bi-orthogonal modulated data of the constant amplitude coded bi-orthogonal modulator 330; and a buffer 350 for storing a number of serial data output from the error bit polarity converter 320 and selectively outputting the corresponding serial data as demodulated data according to a control signal of the distance comparator 340.

The bi-orthogonal demodulation unit 300 comprises a bi-orthogonal demodulator 301 for demodulating the received bi-orthogonal modulated data; a parity bit canceller 302 for canceling the parity bits ($r_0$, $r_1$, $r_2$) from the output data ($b_0$, $b_3$, $b_6$, $r_0$), ($b_1$, $b_4$, $b_7$, $r_1$) and ($b_2$, $b_5$, $b_8$, $r_2$) of the bi-orthogonal demodulator 301; a plurality of switches 303, 304 and 305 for switching the data ($b_0$, $b_3$, $b_6$), ($b_1$, $b_4$, $b_7$) and ($b_2$, $b_5$, $b_8$) from which the parity bits ($r_0$, $r_1$, $r_2$) have been cancelled according to the output signal of the error detector 310; and a parallel to serial converter 307 for receiving the data ($b_0$, $b_3$, $b_6$), ($b_1$, $b_4$, $b_7$) and ($b_2$, $b_5$, $b_8$) through the plurality of switches 303 to 305 if the error detector 310 has not detected errors and converting the data into serial demodulated data.

The error detector 310 comprises first to third parity checkers 311 to 313 for receiving the output data ($b_0$, $b_3$, $b_6$, $r_0$), ($b_1$, $b_4$, $b_7$, $r_1$) and ($b_2$, $b_5$, $b_8$, $r_2$) of the bi-orthogonal demodulator 301, checking the parity bits, determining the occurrence of errors and controlling the plurality of switches 303 to 305; and an OR gate 314 for generating an error determining signal by performing an OR operation for output signals of the first to third parity checkers 311 to 313.

The error bit polarity converter 320 comprises first to third bit polarity converters 321 to 323 for receiving the data ($b_0$, $b_3$, $b_6$), ($b_1$, $b_4$, $b_7$) and ($b_2$, $b_5$, $b_8$) in which errors have occurred through the plurality of switches 303 to 305 and converting their polarities; a plurality of OR gates 324 to 326 for performing OR operations for output data of the first to third bit polarity converters 321 to 323 and data with no error switched in the plurality of switches 303 to 305; and a parallel to serial converter 327 for converting output data of the plurality of OR gates 324 to 326 into serial data.

In the demodulator of the present invention constructed as above, the received constant amplitude bi-orthogonal modulated data are demodulated in the bi-orthogonal demodulator 301 of the bi-orthogonal demodulation unit 300 and are output as the demodulated data ($b_0$, $b_3$, $b_6$, $r_0$), ($b_1$, $b_4$, $b_7$, $r_1$) and ($b_2$, $b_5$, $b_8$, $r_2$). The output demodulated data ($b_0$, $b_3$, $b_6$, $r_0$), ($b_1$, $b_4$, $b_7$, $r_1$) and ($b_2$, $b_5$, $b_8$, $r_2$) are input into the parity bit canceller 302 so that the parity bits ($r_0$, $r_1$, $r_2$) can be cancelled therefrom, whereby only the demodulated data ($b_0$, $b_3$, $b_6$), ($b_1$, $b_4$, $b_7$) and ($b_2$, $b_5$, $b_8$) remain.

In addition, the demodulated data ($b_0$, $b_3$, $b_6$, $r_0$), ($b_1$, $b_4$, $b_7$, $r_1$) and ($b_2$, $b_5$, $b_8$, $r_2$) of the bi-orthogonal demodulator 301 are divided into a plurality of groups to be input into the first to third parity checkers 311 to 313. The first to third parity checkers 311 to 313 make a determination on the occurrence of errors by checking the parity bits of the respective groups of the demodulated data ($b_0$, $b_3$, $b_6$, $r_0$), ($b_1$, $b_4$, $b_7$, $r_1$) and ($b_2$, $b_5$, $b_8$, $r_2$), and apply determination signals to the plurality of switches 303 to 305 of the bi-orthogonal demodulation unit 300. The determination signals are also subjected to an OR operation in the OR gate 314 and then output.

Here, assuming that all of the first to third parity checkers 311 to 313 determine that any errors have not occur and accordingly output low potential, movable terminals of the plurality of switches 303 to 305 are connected to fixed terminals $SB_1$ to $SB_3$, and the OR gate 314 outputs low potential so that the parallel to serial converter 306 is enabled and operates normally. The distance comparator 340 is disabled and does not operate.

Then, the demodulated data ($b_0$, $b_3$, $b_6$), ($b_1$, $b_4$, $b_7$) and ($b_2$, $b_5$, $b_8$) output from the parity bit canceller 302 are input through the plurality of switches 303 to 305 to the parallel to serial converter 306 which converts the demodulated data into serial data. The converted serial data are output as demodulated data.

In addition, if any one of the first to third parity checkers 311 to 313 determines that an error has occurred and accordingly outputs high potential, the OR gate 314 outputs high potential so that the parallel to serial converter 306 is disabled and does not operate. The distance comparator 340 is enabled and operates normally.

Here, assuming that the first parity checker 311 has detected the occurrence of an error and outputs the high potential, and the second and third parity checkers 312 and 313 have not detected the occurrence of an error and output the low potential, the high potential output from the first parity checker 311 causes the movable terminal of the switch 303 to be connected to the fixed terminal $SA_1$, so that the demodulated data ($b_0$, $b_3$, $b_6$) output from the parity bit canceller 302 are input into the first bit polarity converter 321. The polarities of the demodulated data ($b_0$, $b_3$, $b_6$) are sequentially inverted bit by bit and then input through the OR gate 324 into the parallel to serial converter 327. For example, while each one of the polarities of the demodulated data ($b_0$), ($b_3$) and ($b_6$) is inverted, two polarities of the demodulated data ($b_0$), ($b_3$) and ($b_6$) are then inverted and all the polarities of the demodulated data ($b_0$), ($b_3$) and ($b_6$) are finally inverted, the data are sequentially output and then input into the parallel to serial converter 327.

In addition, the demodulated data ($b_1$, $b_4$, $b_7$) and ($b_2$, $b_5$, $b_8$) output from the parity bit canceller 302 are input through the switches 304 and 305 and the OR gates 325 and 326 into the parallel to serial converter 327 according to the output signals of the second and third parity checkers 312 and 313.

Then, the parallel to serial converter 327 sequentially converts the demodulated data ($b_1$, $b_4$, $b_7$) and ($b_2$, $b_5$, $b_8$) and the plurality of demodulated data ($b_0$, $b_3$, $b_6$) that the first bit polarity converter 321 outputs while converting their polarities into the serial data. The plurality of converted serial data are input into the constant amplitude coded bi-orthogonal modulator 303 and are input into and simultaneously stored in the buffer 350.

Here, the constant amplitude coded bi-orthogonal modulator 330 is configured as shown in FIG. 2, and performs the constant amplitude coded bi-orthogonal modulation for the plurality of serial data input from the parallel to serial converter 327. The plurality of modulated data modulated in the constant amplitude coded bi-orthogonal modulator 330 and the received bi-orthogonal modulated data are input into the distance comparator 340.

Then, the distance comparator 340 calculates the bit-by-bit distances between the plurality of modulated data of the constant amplitude coded bi-orthogonal modulator 330 and the received bi-orthogonal modulated data, sums up the distances and determines the summed distance. That is, the distance comparator 340 compares respective values of bits between the received bi-orthogonal modulated data and the plurality of modulated data of the constant amplitude coded bi-orthogonal modulator 330 to detect difference values. The detected difference values are summed. Modulated data with the smallest summed value among the data of the constant amplitude coded bi-orthogonal modulator 330 are determined and the buffer 350 is controlled so that output data of the parallel to serial converter 327 corresponding to the determined data are selected and output as modulated data.

As described above, the modulator according to the present invention performs the constant amplitude bi-orthogonal modulation for predetermined data to be transmitted. Since the data have the constant amplitude, when they are applied to a communication system, power consumption of the communication system can be reduced. Since the linear operation range of the power amplifier can be narrowed, the power amplifier can be manufactured at an inexpensive cost. Further, interference rejection capability (또는 interference robustness) can be ensured and the predetermined data can be transmitted at a high transmission rate and a variable transmission rate.

In addition, the demodulator of the present invention performs demodulation while correcting errors by using the parity bits added when the data are modulated, so that the modulated data can be correctly demodulated without the occurrence of errors.

While the present invention has been illustrated and described in connection with the preferred embodiments, it will be readily understood by those skilled in the art that various modifications and changes can be made thereto without departing from the sprit and scope of the present invention defined by the appended claims.

What is claimed is:

1. An apparatus for constant amplitude coded bi-orthogonal demodulation, comprising:

a bi-orthogonal demodulation unit for demodulating received constant amplitude bi-orthogonal modulated data, canceling parity bits and then generating serial data;

an error detector for detecting the occurrence of an error while dividing the data demodulated in the bi-orthogonal demodulator into a plurality of groups of data and then outputting the serial data of the bi-orthogonal demodulator as demodulated data if an error does not occur;

an error bit polarity converter for sequentially converting bit polarities of data of groups with errors if the error detector detects the errors and converting the data of groups with errors and the data of groups with no errors into the serial data;

a constant amplitude coded bi-orthogonal modulator for performing the constant amplitude coded bi-orthogonal modulation for the output data of the error bit polarity converter;

a distance comparator for comparing bit-by-bit distances between the received bi-orthogonal modulated data and the constant amplitude coded bi-orthogonal modulated data of the constant amplitude coded bi-orthogonal modulator; and a buffer for storing a number of serial data output from the error bit polarity converter and selectively outputting the corresponding serial data as demodulated data according to a control signal of the distance comparator.

2. The apparatus as claimed in claim 1, wherein the bi-orthogonal demodulation unit comprises:
a bi-orthogonal demodulator for demodulating the received bi-orthogonal modulated data;
a parity bit canceller for canceling the parity bits from the output data of the bi-orthogonal demodulator;
a plurality of switches for switching the data of the parity bit canceller according to the output signal of the error detector; and
a parallel to serial converter for receiving the switched data from the plurality of switches if the error detector has not detected errors and converting the data into serial demodulated data.

3. The apparatus as claimed in claim 1, wherein the error detector comprises:
first to third parity checkers for receiving the plurality of groups of data output from the bi-orthogonal demodulator, checking the parity bits, determining the occurrence of errors and controlling the plurality of switches; and
an OR gate for generating an error determining signal by performing an OR operation for output signals of the first to third parity checkers.

4. The apparatus as claimed in claim 1, wherein the error bit polarity converter comprises:
first to third bit polarity converters for receiving the data of the groups in which errors have occurred through the plurality of switches and converting their polarities;
a plurality of OR gates for performing OR operations for output data of the first to third bit polarity converters and data with no error switched in the plurality of switches; and
a parallel to serial converter for converting output data of the plurality of OR gates into serial data.

5. The apparatus as claimed in claim 1, wherein the constant amplitude coded bi-orthogonal modulator comprising:
a serial to parallel converter for converting the output data of the error bit polarity converter into a plurality of groups of data bits according to a data rate control signal;
a constant amplitude encoder for generating the parity bits for the respective groups by combining the plurality of groups of data bits converted in the serial to parallel converter;
an orthogonal code generator for generating a plurality of groups of orthogonal codes which are different from one another;
a plurality of bi-orthogonal modulation units for selecting one orthogonal code in each of the plurality of groups of orthogonal codes according to the plurality of groups of data bits and the parity bits of the respective groups, managing the polarities and performing the bi-orthogonal modulation; and
a parallel summer for parallel summing up output signals of the plurality of bi-orthogonal modulation units.

6. The apparatus as claimed in claim 5, wherein each of the plurality of bi-orthogonal modulation units comprises:
an orthogonal modulator for selecting as a polarity bit each one bit in each of the plurality of groups of data bits and a plurality of the parity bits for the respective groups and selecting one orthogonal code in each of the plurality of groups of orthogonal codes, corresponding to the remained bits except the selected one bit, and
a multiplier for multiplying the output signal of the orthogonal modulator by the selected polarity bit to adjust its polarity and outputting the multiplied and adjusted signal to the parallel summer.

7. The apparatus as claimed in claim 6, wherein the orthogonal modulator is a multiplexer.

8. The apparatus as claimed in claim 5, wherein the constant amplitude encoder generates the parity bits $(r_0)$, $(r_1)$, $(r_2)$ by logically combining the data bits $(b_0 \sim b_2)$, $(b_3 \sim b_5)$, $(b_6 \sim b_8)$ of the respective groups according to the following formulas 2 to 4:

$$r_0 = b_0 \oplus b_3 \oplus b_6 \qquad (2)$$

$$r_1 = b_1 \oplus b_4 \oplus b_7 \qquad (3)$$

$$r_2 = b_2 \oplus b_5 \oplus b_8 \qquad (4)$$

where $\oplus$ represents XOR.

* * * * *